United States Patent
Alber (10) Patent No.: US 9,481,457 B2
(45) Date of Patent: Nov. 1, 2016

(54) VERTICAL TAKE-OFF AND LANDING AIRCRAFT WITH VARIABLE WING GEOMETRY

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 445 days.

(21) Appl. No.: 14/243,540

(22) Filed: Apr. 2, 2014

(65) Prior Publication Data
US 2015/0284075 A1 Oct. 8, 2015

(51) Int. Cl.
*B64C 15/12* (2006.01)
*B64C 39/02* (2006.01)
*B64C 29/02* (2006.01)

(52) U.S. Cl.
CPC .............. *B64C 39/024* (2013.01); *B64C 29/02* (2013.01); *B64C 2201/021* (2013.01); *B64C 2201/088* (2013.01); *B64C 2201/102* (2013.01)

(58) Field of Classification Search
CPC ......... B64C 15/12; B64C 15/02; B64C 3/40; B64C 25/10; B64C 25/14; B64C 25/34; B64C 29/0033; B64C 29/0075; B64C 2201/021; B64C 2201/088; B64C 2201/102; B64C 29/02
USPC ............ 244/7 C, 7 A, 7 R, 6, 8, 12.4, 17.11, 244/17.23, 46, 102 R
See application file for complete search history.

(56) References Cited

U.S. PATENT DOCUMENTS

| | | | | | |
|---|---|---|---|---|---|
| 2,300,268 | A | * | 10/1942 | Stuart | 244/7 B |
| 2,552,864 | A | * | 5/1951 | Piasecki | 244/17.23 |
| 2,622,826 | A | * | 12/1952 | Prince | 244/7 B |
| 2,708,081 | A | * | 5/1955 | Dobson | 244/7 C |
| 2,886,264 | A | * | 5/1959 | Seager | 244/207 |
| 3,035,789 | A | * | 5/1962 | Young | 244/7 C |
| 3,350,035 | A | * | 10/1967 | Schlieben | 244/7 R |
| 4,982,914 | A | * | 1/1991 | Eickmann | 244/56 |
| 5,289,994 | A | * | 3/1994 | Del Campo Aguilera | 244/7 B |
| 5,765,777 | A | * | 6/1998 | Schmittle | 244/48 |
| 5,765,783 | A | * | 6/1998 | Albion | 244/7 B |
| 6,398,157 | B1 | * | 6/2002 | Ingram | 244/7 B |
| 6,655,631 | B2 | * | 12/2003 | Austen-Brown | 244/12.4 |
| 6,896,221 | B1 | * | 5/2005 | Einarsson | 244/7 C |
| 7,658,346 | B2 | * | 2/2010 | Goossen | 244/17.23 |
| 8,167,234 | B1 | * | 5/2012 | Moore | 244/17.25 |
| 8,434,710 | B2 | | 5/2013 | Hothi et al. | |
| 8,505,846 | B1 | | 8/2013 | Sanders, II | |
| 8,602,348 | B2 | | 12/2013 | Bryant | |
| 2007/0158494 | A1 | * | 7/2007 | Burrage | 244/7 R |

(Continued)

OTHER PUBLICATIONS

NASA, XB-70 article dated Dec. 9, 2009, 3 pages.

*Primary Examiner* — Brian M O'Hara
*Assistant Examiner* — Assres H Woldemaryam
(74) *Attorney, Agent, or Firm* — Cantor Colburn LLP (57) ABSTRACT

A vertical take-off and landing (VTOL) aircraft is provided and includes a fuselage, inboard wings extending from opposite sides of the fuselage to define a support plane and engine nacelles disposed along the wings. Each of the wings includes ground alighting elements and a variable geometry such that a portion of the ground alighting elements are alignable with the support plane during in-flight conditions and displaceable from the support plane.

20 Claims, 5 Drawing Sheets

(56) References Cited

U.S. PATENT DOCUMENTS

| | | |
|---|---|---|
| 2008/0230656 A1 | 9/2008 | Kretchmer |
| 2010/0252690 A1* | 10/2010 | Hothi et al. ............ 244/7 B |
| 2011/0315827 A1* | 12/2011 | Collins et al. ............ 244/7 A |
| 2012/0248259 A1* | 10/2012 | Page et al. ............ 244/7 A |
| 2013/0026302 A1* | 1/2013 | Lee et al. ............ 244/7 R |
| 2013/0037653 A1 | 2/2013 | van der Westhuizen |
| 2013/0206921 A1* | 8/2013 | Paduano et al. ............ 244/7 C |

\* cited by examiner

VERTICAL TAKE-OFF AND LANDING AIRCRAFT WITH VARIABLE WING GEOMETRY

BACKGROUND OF THE INVENTION

The subject matter disclosed herein relates to a vertical take-off and landing (VTOL) aircraft and, more particularly, to a VTOL aircraft with variable wing geometry.

A vertical take-off and landing aircraft (VTOL) is an aircraft that can take off, land and hover in a vertical direction and the conduct flight operations in a horizontal orientation. VTOL aircraft may be manned (i.e., piloted) or unmanned in the case of remotely piloted or autonomous aircraft and may be housed or stowed in places with limited deck and storage areas, such as naval ships.

Often, VTOL aircraft have a fixed wing configuration with the landing gear permanently affixed to the fixed tail surfaces. In these cases, the VTOL aircraft sits in its grounded condition on the landing gear so that its nose cone faces upwardly. Such an aircraft requires structures for the landing gear and structures for the outer wing panel and often requires substantial amounts of deck space that may exceed the space required to accommodate its propellers. As noted above, where the VTOL aircraft is provided on a naval ship, such deck space is frequently difficult to spare.

Moreover, since the landing gear is permanently affixed to the fixed wings and the fixed wings generally lie outboard of the VTOL aircraft's center of gravity, maintaining stability of the VTOL aircraft is difficult especially for operations on a naval ship at sea. Additional ship based equipment can enhance an aircraft's compatibly with the ship but such storage mechanisms are expensive, costly and exact a further cost to the quantity of available deck space.

BRIEF DESCRIPTION OF THE INVENTION

According to one aspect of the invention, a vertical take-off and landing (VTOL) aircraft is provided and includes a fuselage, inboard wings extending from opposite sides of the fuselage to define a support plane and engine nacelles disposed along the wings. Each of the wings includes ground alighting elements and a variable geometry outboard wing such that a portion of the ground alighting elements are alignable with the support plane during in-flight conditions and displaceable from the support plane.

According to another aspect of the invention, a vertical take-off and landing (VTOL) aircraft is provided and includes a fuselage, proximal wings extending from opposite sides of the fuselage to define a support plane, engine nacelles coupled with distal ends of the proximal wings, fixed wings and pivotable wings respectively coupled with the distal ends of the proximal wings, each of the fixed wings comprising aircraft ground alighting elements displaced from the support plane and each of the pivotable wings comprising aircraft ground alighting elements displaceable from the support plane and hinges by which the pivotable wings are coupled with the distal ends of the proximal wings and about which the pivotable wings are pivotable such that the aircraft ground alighting elements are displaceable from the support plane.

According to yet another aspect of the invention, a vertical take-off and landing (VTOL) aircraft is provided and includes a fuselage, proximal wings extending from opposite sides of the fuselage to define a support plane extending along longitudinal and chordal axes of the proximal wings, engine nacelles coupled with distal ends of the proximal wings, fixed wings and pivotable wings respectively coupled with the distal ends of the proximal wings, each of the fixed wings comprising first aircraft ground alighting elements displaced from the support plane and each of the pivotable wings comprising second aircraft ground alighting elements displaceable from the support plane and hinges by which the pivotable wings are coupled with the distal ends of the proximal wings and defining pivot axes proximate to the engine nacelles in parallel with the chordal axes of the proximal wings and about which the pivotable wings are pivotable such that the second aircraft ground alighting elements are displaceable from the support plane.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described below, a vertical take-off and landing (VTOL) aircraft is provided and includes fixed and pivotable wings. The pivotable wings allow for stable storage of the VTOL aircraft that does not require an oversized amount of deck space on a naval ship and permit normal operations in flight. The pivotal wings also allow for provision of larger outboard wings that are less constrained by ship space requirements than they otherwise might be. The pivotal wings also allow for fewer components to be included on the VTOL aircraft such as, for example, allowing for the elimination of additional landing gear support structures.

With reference to FIGS. 1-6, a VTOL aircraft 10 includes a fuselage 100 extending along a longitudinal axis that has a nose cone section 101 at a first longitudinal end of the fuselage 100, a tail section 102 opposite from the nose cone section 101 at a second longitudinal end of the fuselage 100, a first side 103 extending along the fuselage 100 and a second side 104 opposite the first side 103 and extending along the fuselage 100. The fuselage 100 is generally formed to have reduced or otherwise limited aerodynamic drag for flight operations and defines an interior in which multiple components are housed for such flight operations.

As illustrated, the fuselage 100 is configured to support unmanned flight operations but it is to be understood that this is not required and that the VTOL aircraft 10 could be manned or unmanned.

The VTOL aircraft 10 further includes a first proximal wing 20 extending radially outwardly from the first side 103 of the fuselage 100, a second proximal wing 30 extending radially outwardly from the second side 104 of the fuselage 100, engine nacelles 40, fixed wings 50, pivotable wings 60 and hinges 70. The first and second proximal wings 20 and 30 extend in substantially opposite directions and are substantially parallel with each other to define a support plane P that extends along longitudinal axes L and chordal axes C of the first and second proximal wings 20 and 30. The first and second proximal wings 20 and 30 each have proximal ends 21 and 31 where the first and second proximal wings 20 and 30 are attached to the fuselage 100 and distal ends 22 and 32, which are opposite from the proximal ends 21 and 31 and defined remotely from the fuselage 100.

The engine nacelles 40 are coupled with the distal ends 22 and 32 of the first and second proximal wings 20 and 30. The engine nacelles 40 extend longitudinally along the chordal axes C of the first and second proximal wings 20 and 30 and each include a drive section 41 and a propeller 42. The propeller 42 includes a hub defining a rotational axis R and a plurality of propeller blades extending radially outwardly from the hub and is driven by the drive section 41 to be rotatable about the rotational axis R. The rotational axes R of each engine nacelle 40 may be defined along and substantially in parallel with the chordal axes C of the each of the first and second proximal wings 20 and 30. As the propeller 42 rotates, the plurality of propeller blades forms a blade disk 43 that has a diameter of $2r_h+2l_b$, where $r_h$ is the radius of the hub and $l_b$ is the length of each of the propeller blades.

The fixed wings 50 and the pivotable wings 60 are respectively coupled with the distal ends 22 and 32 of each of the first and second proximal wings 20 and 30. Each of the fixed wings 50 includes a body 51 and first aircraft ground alighting elements 52 coupled to the body 51. The body 51 extends away from the support plane P in a fixed arrangement such that the first aircraft alighting elements 52 are fixed in a displaced location remote from the support plane P. The pivotable wings 60 are coupled with the distal ends 22 and 32 of the first and second proximal wings 20 and 30 by way of the hinges 70. The hinges 70 define pivot axes at locations defined proximate to the engine nacelles 40. The pivot axes extend along and are defined substantially in parallel with the chordal axes C of the first and second proximal wings 20 and 30 and may be proximate to and substantially parallel with the rotational axes R of each of the propellers 42. The pivotable wings 60 are coupled with the distal ends 22 and 32 by way of the hinges 70 such that each of the pivotable wings 60 is able to pivot about the corresponding pivot axis. Each of the pivotable wings 60 includes a body 61 and second aircraft ground alighting elements 62 coupled to the body 61.

Figure 1:
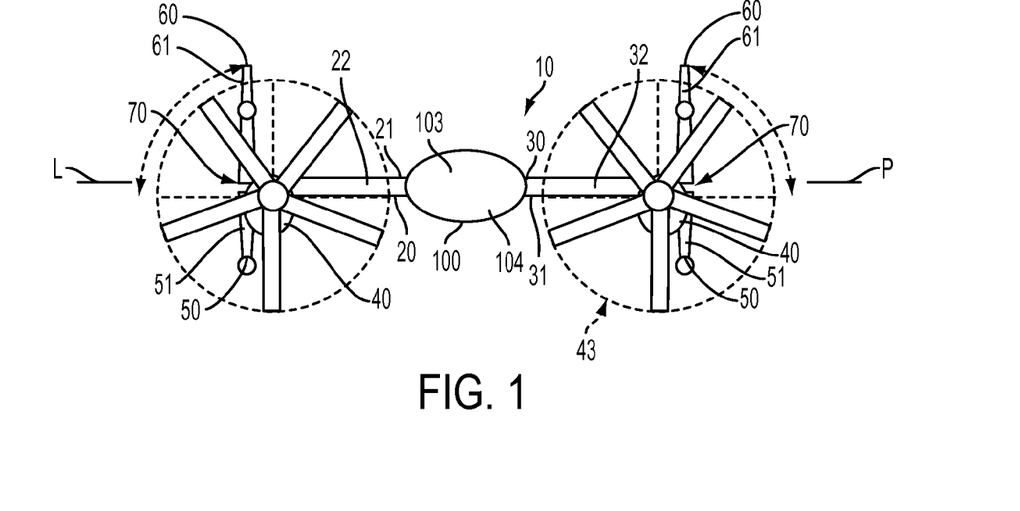
FIG. 1 is a front view of a vertical take-off and landing (VTOL) aircraft in a take-off mode in accordance with embodiments.
Figure 5:
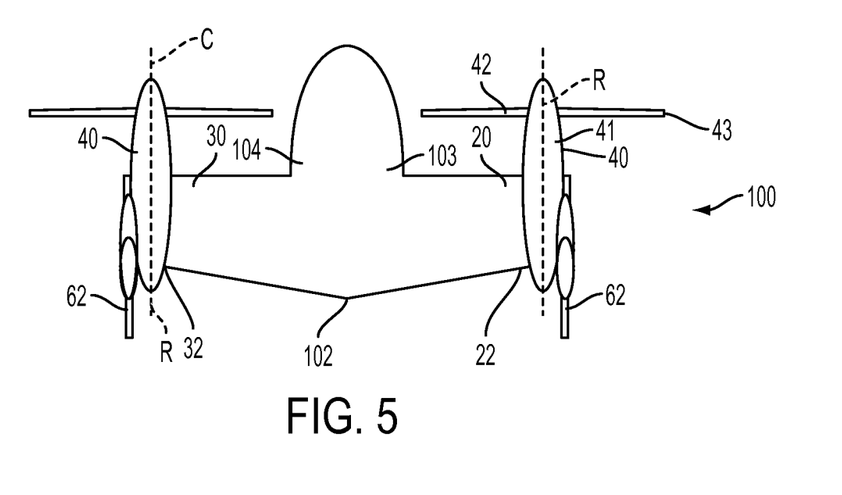
FIG. 5 is an elevation view of the VTOL aircraft of FIG. 1 in a take-off mode in accordance with embodiments.
Figure 6:
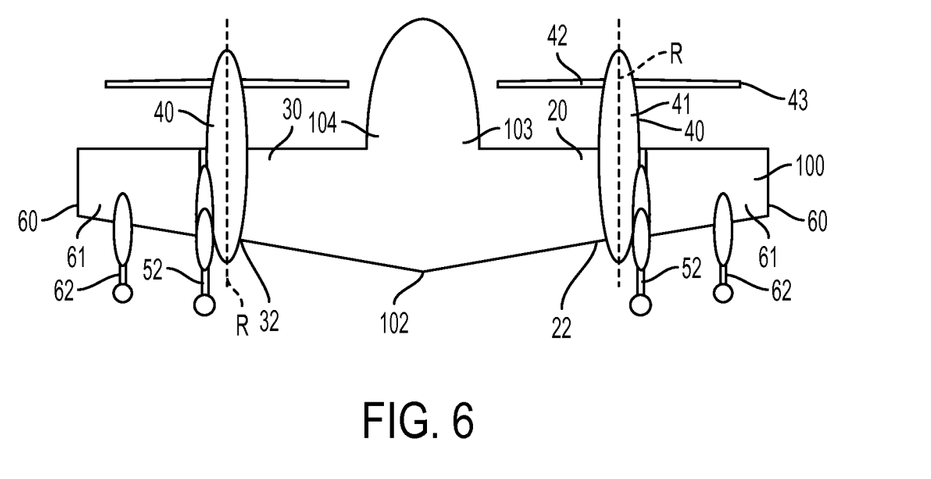
FIG. 6 is an elevation view of the VTOL aircraft of FIG. 1 in a cruise mode in accordance with embodiments.

During grounded conditions where the VTOL aircraft 10 not in flight and following landings of the VTOL aircraft 10, the first and second aircraft ground alighting elements 52 and 62 support the VTOL aircraft 10 in an alighted position. More particularly, the first and second aircraft ground alighting elements 52 and 62 support the VTOL aircraft 10 on the ground (see FIG. 2) with the nose cone section 101 of the fuselage 100 pointed upwardly from the ground and with the tail section 102 pointed at the ground. In this condition, the pivotable wings 60 would normally be pivoted about the pivot axes as shown in FIGS. 1, 3 and 5. By contrast, during in-flight conditions, the pivotable wings 60 would normally be aligned with the first and second proximal wings 20 and 30 and in the support plane P (see FIGS. 2, 4 and 6).

In accordance with embodiments, the second aircraft ground alighting elements 62 may be disposed along the body 61 of each of the pivotable wings 60. As such, the second aircraft ground alighting elements 62 may be disposed in a location defined in an alignment condition with the support plane P during in-flight conditions of the VTOL aircraft 10 (see FIGS. 2, 4 and 6). Alternatively, the second aircraft ground alighting elements 62 may be displaceable from the support plane P such as when the VTOL aircraft 10 is grounded. In this case, the pivotable wings 60 are pivoted about the pivot axes and the second aircraft ground alighting elements 62 are displaced from the support plane P.

Thus, when the VTOL aircraft 10 is grounded, the first and second aircraft ground alighting elements 52 and 62 may both be displaced from the support plane P such that the VTOL aircraft 10 is securely supported with the nose cone section 101 of the fuselage 100 pointed upwardly from the ground and with the tail section 102 pointed at the ground. In accordance with embodiments and, as shown in FIG. 2, a center of mass $C_M$ of the VTOL aircraft 10 would be located, or centered in some cases, between the first and second aircraft ground alighting elements 52 and 62 in the grounded condition.

Figure 7:
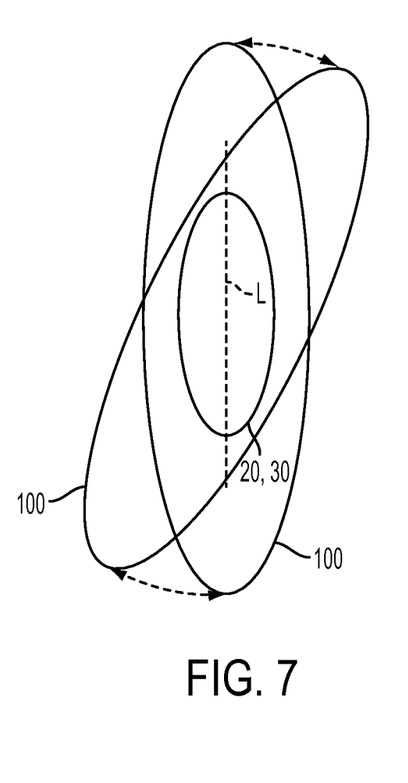
FIG. 7 is a schematic side view of a fuselage of the VTOL of FIG. 1 in accordance with further embodiments.

Although the VTOL aircraft 10 of FIGS. 1-6 is not illustrated as being configured for relative pivoting between the first and second proximal wings 20 and 30 and the fuselage 100, it is to be understood that such pivoting is possible. Accordingly and, with reference to FIG. 7, the fuselage 100 is pivotable relative to the first and second proximal wings 20 and 30 from a first condition, in which the longitudinal axis of the fuselage 100 is substantially aligned and in parallel with the longitudinal axes L of the first and second proximal wings 20 and 30, to a second condition, in which the longitudinal axis of the fuselage 100 is transversely oriented to the longitudinal axes L of the first and second proximal wings 20 and 30.

Figure 2:
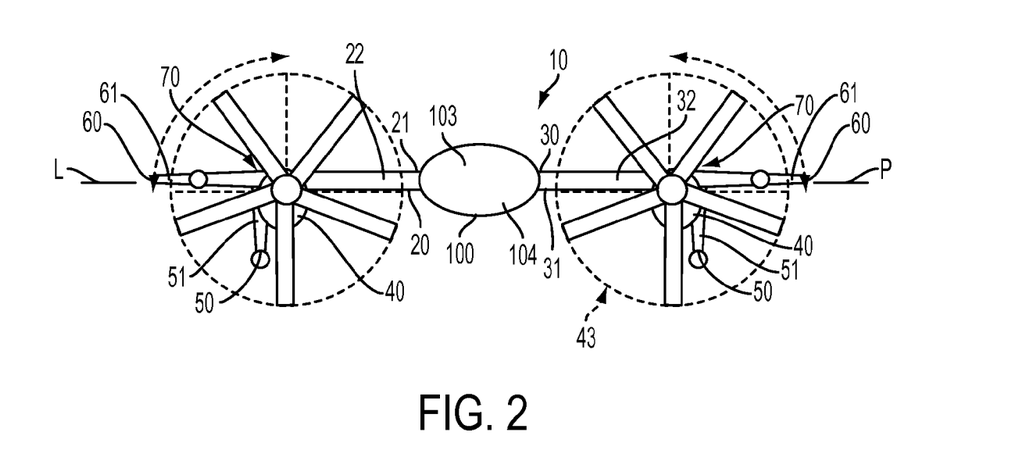
FIG. 2 is a front view of the VTOL aircraft of FIG. 1 in a cruise mode in accordance with embodiments.
Figure 3:
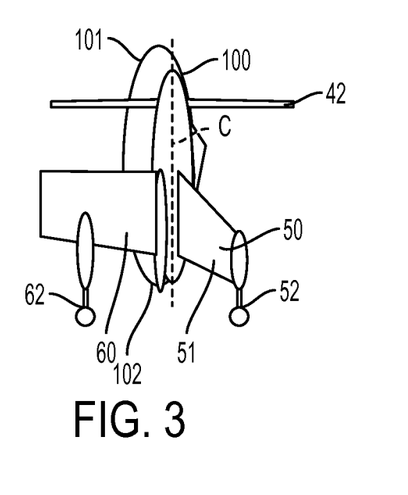
FIG. 3 is a side view of the VTOL aircraft of FIG. 1 in a take-off mode in accordance with embodiments.
Figure 4:
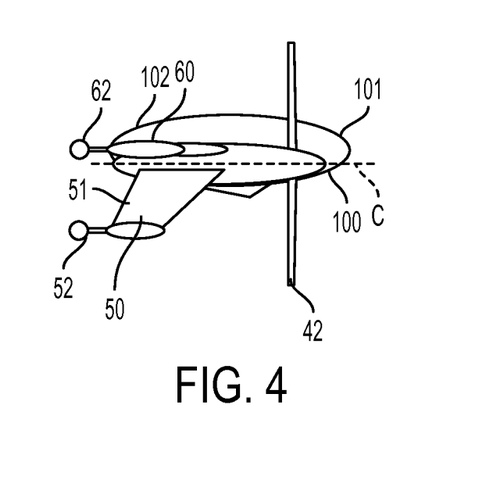
FIG. 4 is a side view of the VTOL aircraft of FIG. 1 in a cruise mode in accordance with embodiments.

In accordance with embodiments and, as shown in FIGS. 1 and 2, respective lengths of the fixed wings 50 and the pivotable wings 60 may be wholly or at least substantially encompassed within the blade disk 43. More particularly, when the VTOL aircraft 10 is grounded and both the fixed wings 50 and the pivotable wings 60 extend away from the support plane P, the outer-most ends of the fixed wings 50 and the pivotable wings 60 are within or extend just beyond the area defined by the blade disk 43. Thus, an area assumed by the VTOL aircraft 10 as a whole may be largely determined by the size of the blade disk 43 and not the wingspan or the lengths of the fixed wings 50 or the pivotable wings 60. During flight conditions, the outer-most ends of the pivotable wings 60 may be aligned with or just extended beyond the outer-most edge of the blade disk 43.

Figure 8:
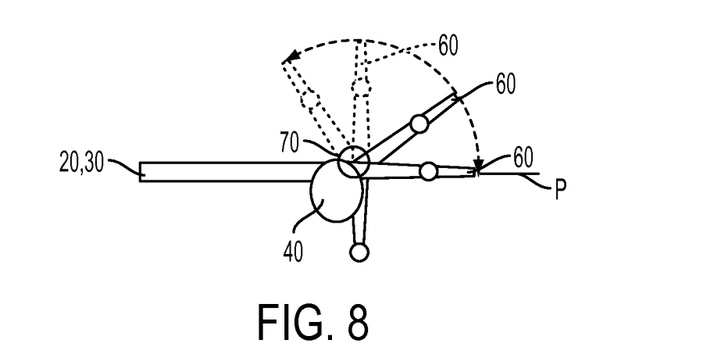
FIG. 8 is a front view of a portion of the VTOL of FIG. 1 in accordance with further embodiments.
Figure 9:
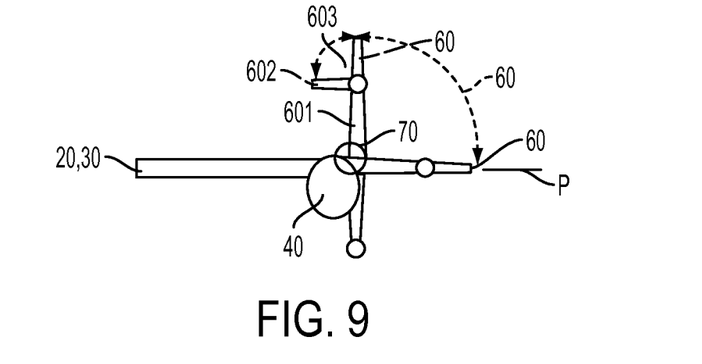
FIG. 9 is a front view of a portion of the VTOL aircraft of FIG. 1 in accordance with further alternative embodiments.

With reference to FIGS. 8 and 9 and, in accordance with still further embodiments, the pivotable wings 60 may be configured to pivot 90 degrees about the hinges 70 and the pivot axes. Alternatively, as shown in FIG. 8, the pivotable wings 60 may be configured to pivot beyond 90 degrees. In this case, the pivotable wings 60 may have lengths that extend beyond the blade disk 43 but, due to the increased pivot angle, a distance between the outer-most ends of the pivotable wings 60 and the support plane P may be less than the radius of the blade disk 43.

As another alternative or additional embodiment, each of the pivotable wings 60 may include proximal wing portions 601, which are each coupled to the corresponding one of the hinges 70, distal wing portions 602, and distal hinges 603 by which the distal wing portions 602 are pivotably coupled to the proximal wing portions 601. With these alternative or additional features, the first and second proximal wings 60 can have an additional elbow joint. Again, this could allow the pivotable wings 60 to have lengths that extend beyond the blade disk 43 but, due to the additional elbow joint, a distance between the outer-most ends of the pivotable wings 60 and the support plane P may ultimately be less than the radius of the blade disk 43

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vertical take-off and landing (VTOL) aircraft, comprising:
    a fuselage extending along a longitudinal axis that has a nose cone section at a first longitudinal end of the fuselage, a tail section opposite from the nose cone section at a second longitudinal end of the fuselage;
    wings extending from opposite sides of the fuselage to define a support plane; and
    engine nacelles disposed along the wings,
    each of the wings comprising ground support elements and a variable geometry such that a portion of the ground support elements are pivotable about a pivot axis that is parallel to the longitudinal axis:
    alignable with the support plane and disposed aft of the wings during in-flight conditions with the longitudinal axis oriented substantially horizontally, and
    displaceable from the support plane and disposed below the wings during grounded conditions with the longitudinal axis oriented substantially vertically.

2. The VTOL aircraft according to claim 1, wherein the fuselage is configured for unmanned flight operations.

3. A vertical take-off and landing (VTOL) aircraft, comprising:
    a fuselage;
    proximal wings extending from opposite sides of the fuselage to define a support plane;
    engine nacelles coupled with distal ends of the proximal wings;
    fixed wings and pivotable wings respectively coupled with the distal ends of the proximal wings, each of the fixed wings comprising aircraft ground support elements displaced from the support plane and each of the pivotable wings comprising aircraft ground support elements displaceable from the support plane; and
    hinges by which the pivotable wings are coupled with the distal ends of the proximal wings and about which the pivotable wings are pivotable such that the aircraft ground support elements are displaceable from the support plane.

4. The VTOL aircraft according to claim 3, wherein the fuselage is configured for unmanned flight operations.

5. The VTOL aircraft according to claim 3, wherein the fuselage is pivotable relative to the proximal wings.

6. The VTOL aircraft according to claim 3, wherein the engine nacelles each comprise a propeller which is rotatable about a rotational axis.

7. The VTOL aircraft according to claim 6, wherein blades of the propeller define a blade-disk diameter encompassing a length of the pivotable wings.

8. The VTOL aircraft according to claim 3, wherein the pivotable wings are configured to pivot 90 degrees about the hinges.

9. The VTOL aircraft according to claim 3, wherein the pivotable wings are configured to pivot beyond 90 degrees about the hinges.

10. The VTOL aircraft according to claim 3, wherein the pivotable wings comprise:
    proximal wing portions which are coupled to the hinges;
    distal wing portions; and
    distal hinges by which the distal wing portions are pivotably coupled to the proximal wing portions.

11. The VTOL aircraft according to claim 3, wherein the pivotable wings are pivotable into alignment with the support plane during in-flight conditions and pivotable such that the aircraft ground support elements are displaced from the support plane during grounded conditions.

12. A vertical take-off and landing (VTOL) aircraft, comprising:
    a fuselage;
    proximal wings extending from opposite sides of the fuselage to define a support plane extending along longitudinal and chordal axes of the proximal wings;
    engine nacelles coupled with distal ends of the proximal wings;
    fixed wings and pivotable wings respectively coupled with the distal ends of the proximal wings, each of the fixed wings comprising first aircraft ground support elements displaced from the support plane and each of the pivotable wings comprising second aircraft ground support elements displaceable from the support plane; and
    hinges by which the pivotable wings are coupled with the distal ends of the proximal wings and defining pivot axes proximate to the engine nacelles in parallel with the chordal axes of the proximal wings and about which the pivotable wings are pivotable such that the second aircraft ground support elements are displaceable from the support plane.

13. The VTOL aircraft according to claim 12, wherein the fuselage is configured for unmanned flight operations.

14. The VTOL aircraft according to claim 12, wherein the fuselage is pivotable relative to the proximal wings.

15. The VTOL aircraft according to claim 12, wherein the engine nacelles each comprise a propeller which is rotatable about a rotational axis defined in parallel with the chordal axes of the proximal wings.

16. The VTOL aircraft according to claim 15, wherein blades of the propeller define a blade-disk diameter encompassing a length of the pivotable wings.

17. The VTOL aircraft according to claim 12, wherein the pivotable wings are configured to pivot 90 degrees about the hinges.

18. The VTOL aircraft according to claim 12, wherein the pivotable wings are configured to pivot beyond 90 degrees about the hinges.

19. The VTOL aircraft according to claim 12, wherein the pivotable wings comprise:
   proximal wing portions which are coupled to the hinges;
   distal wing portions; and
   distal hinges by which the distal wing portions are pivotably coupled to the proximal wing portions.

20. The VTOL aircraft according to claim 12, wherein the pivotable wings are pivotable into alignment with the support plane during in-flight conditions and pivotable such that the second aircraft ground support elements are displaced from the support plane during grounded conditions.

* * * * *